No. 620,019. Patented Feb. 21, 1899.
D. CRUISE.
HORSESHOE PAD.
(Application filed Mar. 29, 1898.)

(No Model.)

WITNESSES:
Donn Twitchell
Isaac Wen.

INVENTOR
D. Cruise
BY
Munn
ATTORNEYS.

THE NORRIS PETERS CO., PHOTO-LITHO., WASHINGTON, D. C.

UNITED STATES PATENT OFFICE.

DANIEL CRUISE, OF NEW YORK, N. Y.

HORSESHOE-PAD.

SPECIFICATION forming part of Letters Patent No. 620,019, dated February 21, 1899.

Application filed March 29, 1898. Serial No. 675,531. (No model.)

*To all whom it may concern:*

Be it known that I, DANIEL CRUISE, of the city of New York, borough of Manhattan, in the county of New York and State of New York, have invented a new and Improved Horseshoe-Pad, of which the following is a full, clear, and exact description.

This invention is a horseshoe-pad constructed of rubber or other resilient material and provided with grooves, wherein are embedded strips of leather or other indurate material, so that the pad retains all of the advantages of elasticity and at the same time presents indurated surfaces to the ground to prevent the slipping of the horse's feet.

This specification is the disclosure of one form of my invention, while the claims define the actual scope of the invention.

Reference is to be had to the accompanying drawings, forming a part of this specification, in which similar characters of reference indicate corresponding parts in all the figures.

Figure 1:
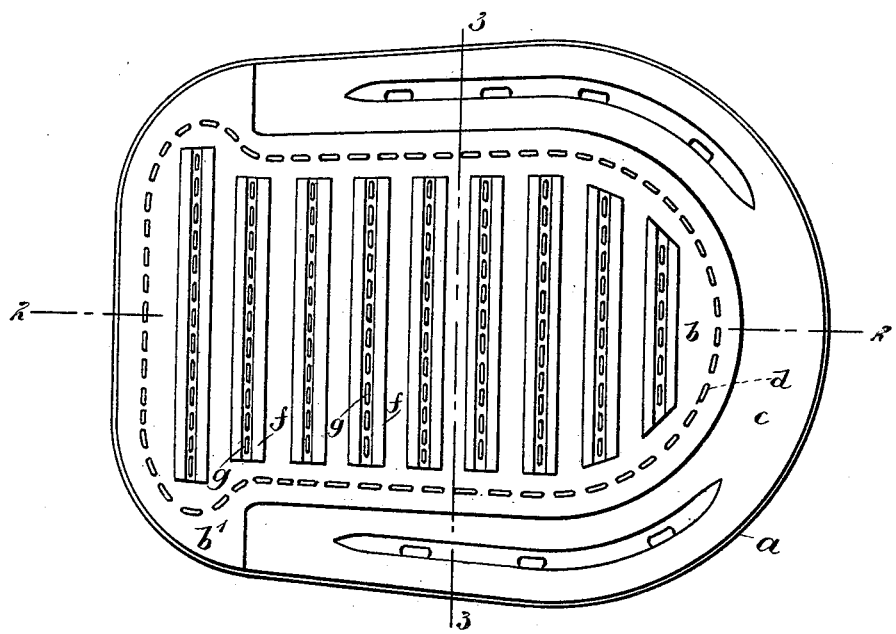
Figure 2:
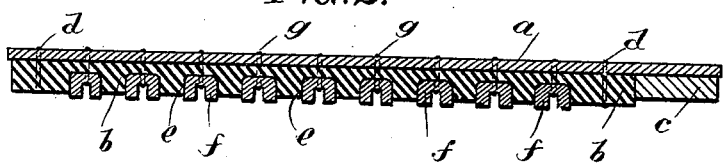
Figure 3:
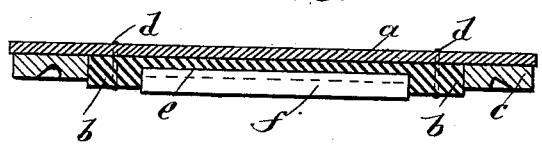

Figure 1 is a bottom plan view of the invention, showing the shoe in place. Fig. 2 is a sectional view on the line 2 2 of Fig. 1, and Fig. 3 is a sectional view on the line 3 3 of Fig. 1.

The pad has the usual leather back $a$, which lies against the hoof of the horse. The pad $b$ is formed of soft rubber, with a laterally-enlarged heel portion $b'$, so that the flat shoe $c$ may fit around the main portion of the pad and engage directly with the back $a$, as shown in Figs. 2 and 3. The pad $b$ may be cemented to the back $a$. The pad is also secured by an endless line of stitching $d$ run around its edges.

In producing the pad $b$ transverse grooves $e$ are formed therein, which grooves are arranged parallel with each other and may be any number desired. Fitted in each groove is a strip of leather or other indurate material $f$. These strips of leather $f$ are bent or folded longitudinally and fitted in the grooves, as shown best in Fig. 2. The strips are secured by lines of stitching $g$, that pass through the strips $f$, the pad $b$, and the back $a$. By these means the three parts $a$, $b$, and $f$ are firmly and immovably secured together. The pad $b$ is arranged to project slightly below the shoe $c$, so that the blow of the horse's step will be received on the pad. The whole structure is secured to the hoof by nails driven through the openings in the shoe and through the back $a$ into the hoof. The strips $f$ project below the rubber pad $b$ to a very slight degree, so that they will engage the ground and prevent the slipping of the horse. These strips also serve as highly effective means for assisting in securing the pad to the back $a$. The strips $f$ may be of any number desired. I have shown them arranged throughout the area of the pad $b$; but it is clear that they may be reduced or increased in number without departing from my invention.

Having thus described my invention, I claim as new and desire to secure by Letters Patent—

1. A horseshoe-pad having a back, an elastic pad arranged beneath the same, an indurate strip embedded in the elastic pad, and fastening devices passed through the strip, the pad and the back.

2. A horseshoe-pad having a back, an elastic pad beneath the same, an indurate strip folded longitudinally and embedded in the pad, and fastening devices engaging with the fold in the strip and passed through the strip and through the pad and back.

3. A horseshoe-pad having a leather back adapted to engage the hoof of the horse, a rubber pad located beneath the back, a leather strip embedded in the pad, and fastening devices passed through the strip, the pad and the back.

4. A horseshoe-pad having a back, an elastic pad located beneath the back, an endless line of stitching run around the edge of the pad and passing into the back, a series of indurate strips embedded in the lower surface of the pad and transversely disposed to the pad, and a line of stitching run through the strips and through the pad and the back.

5. A horseshoe-pad formed of elastic material and provided with an indurate strip embedded therein and presenting a part of its surface to the ground, and fastening devices running lengthwise along the strip and passing through the same and through the pad.

DANIEL CRUISE.

Witnesses:
ISAAC OWENS,
JNO. M. RITTER.